U.S. Patent Office 3,804,809
Patented Apr. 16, 1974

3,804,809
POLYURETHANE COMPOSITIONS HAVING IMPROVED HYDROLYTIC STABILITY
Armand E. Brachman, Allentown, Pa., assignor to GAF Corporation, New York, N.Y.
No Drawing. Filed Sept. 29, 1972, Ser. No. 293,581
Int. Cl. C08g 22/10, 53/20
U.S. Cl. 260—75 NK                14 Claims

ABSTRACT OF THE DISCLOSURE

Polyurethanes having improved hydrolytic stability being especially useful where they are used under adverse conditions of humidity are prepared by reacting a mixture of an imine pre-treated hydroxyl terminated polyester soft segment with a hydroxyl poly(alkylene oxide), an aliphatic glycol, and a poly isocyanate and extender.

BACKGROUND OF THE INVENTION

This invention relates to polyurethanes and relates more particularly to polyurethanes comprising the reaction product of a mixture of a hydroxyl terminated polyester soft segment, a hydroxyl poly(alkylene oxide) and a glycol; reacted with an aryl diisocyanate, said polyester segments having been pre-treated with an imine before conversion to a polyurethane by reaction with said other components. Polyester-polyurethanes have many desirable features, such as, high abbrasion resistance, high strength, heat stability and good mechanical properties. Heretofore, however, the fact that they had only a modest hydrolitic stability precluded their use in applications where the polymeric composition was subject to high humidity. It is known in the art that various polyamines are useful as extenders for polyurethanes. Heretofore it has not been known that treatment with a small amount of an imine would improve the hydrolytic stability of the polyester-polyurethane compositions. It has now been found that improved hydrolytic stability can be imparted to the above composition without sacrificing the desirable mechanical properties associated therewith. Quite suprisingly, it has also been found that substitution of a primary amine for the instant imine, fails to improve the properties of the polyurethane.

Polyurethanes may be prepared by reacting together a mixture of certain hydroxyl poly(alkylene oxides) and glycols, with diphenyl diisocyanates. Another class of useful polyurethanes is obtained by reacting together a mixture of certain polyesters mixed with the glycol and with diphenyl diisocyanates. These polyurethanes, however, have only modest tensile strengths and other physical and chemical properties.

SUMMARY OF THE INVENTION

It is an object of the instant invention to avoid one or more drawbacks of the prior art.

It is another object of the invention to provide for a polyesterurethane composition having improved hydrolytic stability and other physical properties without, however, sacrificing desirable mechanical properties associated with such compositions.

It is a further object of the invention to provide for a method of preparing such compositions.

Further objects and advantages of the invention will become more apparent from the description as proceeds hereinafter.

Broadly speaking the instant invention includes the provision of a polyurethane having improved hydrolytic stability comprising the reaction product of a mixture of (A) an imine pre-treated poly hydroxy terminated polyester and (B) and aliphatic glycol reacted with (C) an aryl diisocyanate, the molar amount of (A) and (B) combined being substantially equivalent to the molar amount of (C), and a method of making same. It is to be understood that component (A) due to the imine pre-treatment displays both —NH$_2$ and OH$^-$ termination.

It has now been found that when a mixture of about 60 to 85 parts of an imine pre-treated polyester diol soft segment having a molecular weight between 600 and 3500 is mixed with about 15 to about 10 parts by weight of a poly glycol having a molecular weight of between about 800 and about 4000 and from about 0.7 to 2.5 moles of an aliphatic glycol (having a molecular weight of about 28–250) per mole of total hydroxyl polyester and glycol to provide a mixture having an average molecular weight of about 350 to about 850 and thereafter reacting with a diphenyl diisocyanate in a molar amount equal to the total hydroxyl number, a polyurethane is obtained having a good balance of valuable physical properties and quite unexpectedly improved hydrolytic stability.

Generally good performance is found for polyurethane compositions based on an imine pre-treated 1,4-butanediol adipate (B$_1$D-Ad); 1,4-butanediol (B$_1$D); and 4,4'-diphenyl methane diisocyanate (MDI). Testing for hydrolytic stability by boiling the product in water for 70 hrs. reveals poor resistance to degradation when a non imine pre-treated polyester is used. The polyurethanes thus produced are useful for mechanical parts, belts, films, containers and coatings requiring good abrasion resistance, toughness and oil resistance especially in areas where hydrolytic stability is also required.

The polyester preferred for use in this invention is an essentially linear di or a poly hydroxyl terminated one, each having a molecular weight of between about 600 and about 3500 and an acid number less than 5, preferably the polyester has a molecular weight of from about 900 to about 2000 and an acid number less than 2, and ideally an acid number less than about 1 in order to obtain a product of optimum physical properties. The molecular weight may be determined by assay of the terminal functional groups and is an average molecular weight. The polyester is prepared ordinarily by an esterification reaction of an aliphatic polybasic acid or an anhydride thereof with a glycol. Molar ratios of slightly more than 1 mole of glycol to acid or preferred so as to obtain linear chains containing a preponderance of terminal hydroxyl groups.

The basic polyesters utilized include polyesters prepared from the esterification of such dicarboxylic acids as adipic, succinic, pimelic, suberic, azelaic, sebacic and the like or their anhydrides. Preferred acids are those dicarboxylic acids of the formula HOOC—R—COOH wherein R is an alkylene radical containing 2 to 8 carbon atoms. More preferred are those represented by the formula

$$HOOC—(CH_2)_x—COOH$$

wherein $x$ is a number from 2 to 10. Adipic acid is preferred. The glycols utilized in the preparation of the polyester by reaction with the aliphatic dicarboxylic acid are preferably straight chain glycols containing from about 2 to about 10 carbon atoms such as ethylene glycol; 1,3-propanediol; butanediol-1,4; hexamethylenediol-1,6; octamethylenediol-1,8 and the like. In general the glycol is preferably of the formula HO(CH$_2$)$_x$OH, wherein $x$ may be 2 to 10, but preferably is 4 to 8, butanediol-1,4 is particularly preferred.

Imine pre-treatment can be carried form about room temperature up to about 150° C. (or more), provided a closed pressure type vessel is used for reactions above about 100° C. Although propylene imine boils at a relatively low 66° C., when used in small amounts, sufficient solubility exists that little if any will bubble out of a reaction vessel at 100° C. Times as short as 10 min. at high temperature may suffice. At lower temperatures, such as, 50° C., as much as 24 hrs. may be needed. The necessary minimum time-temperature will vary from polyester to polyester. Catalysts might accelerate imine-ester reactions.

Any imine type structure is operable, i.e. ethylene and propylene imine. Similar treatment with an epoxide (styrene epoxide) or with n-butyl amine gives no improvement. Suitable imines have the formula:

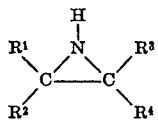

wherein $R^1$, $R^2$, $R^3$ and $R^4$ are H, $C_{1-12}$ alkyl, such as methyl, ethyl or decyl, aryl, such as, phenyl or alkaryl, such as, phenethyl and alkyl ethers, such as,

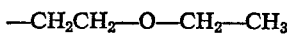

and intercombinations thereof. Operable imines (aziridine) include aziridine, 2-methylaziridine, 2,2-dimethylaziridine, 2 - phenylaziridine, 2-n-butylaziridine, 2-ethyl-2-phenylaziridine and the like. The ratio of the primary imine to the polyester is 0.001 to 1% by weight, preferably not more than 0.2% by weight.

Another beneficial effect resulting from imine treatment is a considerably faster rate of polyurethane formation.

The chemical reason for the improvement is not known but could come from the interaction between the residual COOH in the polyester and the imine. Possibly, a similar treatment might be useful to stabilize lower molecular weight esters used as plasticizers or lubricants.

In the practice of the invention an aliphatic glycol in an amount from about 0.25 to 2.15 moles per mole of pretreated polyester is employed, preferably 0.75 to 2.25. The glycol should be mixed with the polyester prior to reaction of the mixture with the diphenyl diisocyanate. Aliphatic glycols containing 2 to 12 carbon atoms are contemplated for use in this invention. The glycol preferred for this purpose is butanediol-1,4. Other glycols which may be employed include, ethylene glycol, pentanediol, hexanediol, octanediol, dodecanediol and the like which preferably contain the hydroxyl groups in the terminal position. A valuable group of glycols are alkylene glycols containing 4 to 6 carbon atoms.

While any aryl diisocyanate may be employed for reaction with the hydroxyl polyester, hydroxyl poly(methylene oxide) and glycol to form useful products, diphenyl methane diisocyanate; diphenyl methane - p,p'-diisocyanate; dichlorodiphenyl methane diisocyanate; dimethyl diphenyl methane diisocyanate; diphenyl dimethyl methane diisocyanate; dibenzyl diisocyanate; bitolylene diisocyanate; diphenyl ether diisocyanate and the like of the formula

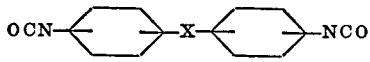

wherein X may be a valence bond, an alkylene radical containing preferably 1 to 5 carbon atoms, NR wherein R is an alkyl radical, oxygen, sulfur, $SO_2$ and the like; and the isocyanate groups are preferably in a para-position are preferred. More preferred are the diphenyl methane diisocyanates, and excellent results are obtained from diphenyl methane-p,p'-diisocyanate (MDI).

DETAILED DESCRIPTION

The ratio of reactants employed may be varied from about 0.95 to 1.08 moles of diphenyl diisocyanate per combined mole of polyester, hydroxy polyether and low molecular weight glycol. The ratio of hydroxy polyether to polyester can vary from 1:1 to 9:1. The amount of glycol depends in part upon the molecular weight of the polyester employed. The amount of diphenyl diisocyanate used is in turn dependent upon the total amount of glycol and polyester and should be a molar amount equivalent to these latter reactants so that there are essentially no free unreacted isocyanate and hydroxyl groups remaining in the reaction product. Particularly useful products are obtained with mole ratios of reactants of 1 mole of hydroxyl polyester 0.7 to 2.5 moles of aliphatic diol and 1.7 to 2.4 moles of diphenyl diisocyanate.

An essential part of this invention is that the mixture of aliphatic glycol and hydroxyl polyester has an average hydroxyl number molecular weight of about 350 to about 850 and more preferably from about 400 to about 600. In order words, when the average molecular weight of the mixture is below about 325 and above about 900, the polyurethanes made therefrom are not suitable for the intended purpose. To obtain these average molecular weights for the mixture it is desirable that the molecular weights and amount of glycol used be balanced within the quantities set forth hereinabove. In other words, with very high molecular weight polyesters larger amounts of glycol are required to give the desired average molecular weight. Thus, not only should the average molecular weight of the mixture be observed, but it should be obtained by using hydroxyl polyesters of the types and molecular weights set forth hereinabove, and the glycol used should also be present within the ranges set forth hereinabove.

As is apparent from the above recited ratios of reactants for preparing the unique elastomers of this invention, a product is obtained in which there is essentially no free or unreacted diisocyanate or glycol. Of course, a small amount of unreacted isocyanate groups may be tolerated but it is desirable that they are essentially reacted. Excess free unreacted glycol results in products which are likewise less valuable. An excess of either glycol or diisocyanate of less than about 3% above the required for complete utilization of the reactants is desirable. Preferably, the molar amount of glycol is substantially equivalent to the molar amount of diphenyl diisocyanate employed. More preferred, of course, are equimolar reacting ratios of reactants.

The reaction employed to prepare the novel products of the invention should be conducted under anhydrous conditions with dry reactants, that is, that the reaction mixture is subsantially free of water. It is recognized that as a practical matter it is difficult to conduct such a reaction with absolutely dry reactants under completely anhydrous conditions so the requirements of this invention are met when the reaction mixture is essentially free of water. It should be noted that when the reaction is substantially complete it is not necessary to rigidly guard against the introduction of water into the reaction mixture. As a guide, there should be less than about 0.1% water present in the reaction mixture.

The improved polyurethanes are readily obtained by melting the pre-treated polyester and aliphatic diol and while in a molten state adding thereto the aryl diisocyanate and heating, normally at a temperature of about 50 to about 180° C. to complete the reaction.

For example, a mixture of measured amounts of pre-treated polyester and aliphatic diol are melted and stirred for about one hour at a pressure of about 5 mm. and a temperature of 110° C. To this mixture is added a measured amount of a diisocyanate, i.e., diphenyl methane-p,p'-diisocyanate (MDI), weighed out and charged to within ±0.5% of the stoichiometric equivalency of NCO group to OH groups, the molar amount of the diisocyanate thereby being substantially equivalent to the molar amount of the polyester glycol and the aliphatic glycol combined. The reaction mixture is stirred for 1 to 5 minutes, and then heated in silicone coated trays for 1 to 2 hours at 150° C. to complete the reaction.

A series of improved polyurethanes were prepared in accordance with the procedure described above. Hydroxyl polyesters of different molecular weights were used. The proportions and physical properties of the resulting products are set forth in the table below. The pre-treated hydroxyl polyester was prepared from 1,4-butane diol and adipic acid. All parts and proportions herein and in the appended claims are by weight unless otherwise specified.

EXAMPLE I

Polyester imine pre-treatment 285 grams hydroxyl terminated polyester is placed in a flask equipped with stainless steel agitator (i.e., anchor type), a thermometer, nitrogen inlet and nitrogen exit passing up through a (5) bulb water cooled reflux condenser. Heat is applied i.e., (electric heating mantle) to raise the internal temperature to 60° C. 0.77 grams propylene imine is added by temporarily removing the nitrogen inlet line, adding the correct amount of imine to give 0.25% in weight of polyester (.77 gm.), reinserting the nitrogen line and gently stirring for 1½ hrs. The resultant treated polyester may be used without further treatment in subsequent polyurethane reactions.

EXAMPLE II

Same as Example I, but using ethylene imine in amounts of 0.29 gram.

EXAMPLE III

Same as Example II, but using propylene imine in amounts of .008 gram.

about 185° C. Stirring is maintained for about 3 minutes. The hot, semisolid mass is then transferred to a shallow pan lined with polytetrafluoroethylene using a spatula, a polytetrafluoroethylene lined lid is placed on top of the resin melt, and the melt is placed in a circulating air oven at 150° C. for 1 hr. to complete the reaction.

|  | M.W. | Gram |  |
|---|---|---|---|
| Poly(1,4-butanediol adipate) [1] | 1,315 | 440 | [2] .6680 |
| 1,4-butanediol | 90.1 | 60 | [2] 1.3320 |
| Neodol 23 (Shell $C_{12}$-$C_{13}$ primary linear alcohol) | 197 | 3.9 | .0200 |
| Total |  |  | 2.0200 |
| 4,4'-diphenylmethanediisocyanate | 250.1 | 255.1 | 2.0402 |

[1] Poly (butanediol adipate) 6553-150—treated with 0.27% propylene imine.
[2] Equivalent.

Table I (below) shows the improvement afforded in retained tensile strength and elongation after immersion in boiling water for 70 hrs. for polyurethanes derived from imine modified polyesters. The controls lost most of their elasticity e.g., more than 90% elongation. Presence of 0.003% butyl amine failed to improve performance. As little as 0.001% propylene imine (on polyester) reduced tensile loss but not elongation loss. Either 0.003% propylene or ethylene imine reduced both tensile and elongation loss. Increased percent imine pre-treatment improved the hydrolytic stability even further.

TABLE I
Property Change in PU's After Boiling In Water for 70 Hours

| Reference | Polyester pretreatment | Percent elongation [1] | | Tensile strength, p.s.i.[1] | | Change in break (percent) | |
|---|---|---|---|---|---|---|---|
| | | Initial | Final | Initial | Final | Elongation | Tensile |
| 1 | None | 637 | 32 | 4,100 | 1,243 | −95 | −79 |
| 2 | do | 727 | 55 | 7,250 | 1,167 | −92 | −89 |
| 3 | 0.003% di-n-butyl amine | 640 | 72 | 6,775 | 1,810 | −89 | −73 |
| 4 | 0.001% propylene imine | 441 | 35 | 3,325 | 1,570 | −92 | −53 |
| 5 | 0.003% propylene imine | 543 | 255 | 4,640 | 2,462 | −53 | −47 |
| 6 | 0.003% ethylene imine | 593 | 225 | 5,040 | 2,148 | −62 | −57 |
| 7 | 0.006% propylene imine | 274 | 142 | 2,370 | 1,825 | −48 | −23 |
| 8 | 0.25% propylene imine | 612 | 703 | 5,680 | 4,998 | +15 | −12 |

[1] ASTM D-412-64T.

EXAMPLE IV

A modification, employs a poly(butanediol/propylene glycol/adipate) synthesized in a (4-liter) resin jar at 225° C. by direct condensation of 658 grams of adipic acid, 368 grams of 1,4-butanediol and 78 grams of 1,2-propanediol. After polyester formation is complete, the hot mass is permitted to cool to 100° C. under a nitrogen atmosphere. A reflux condenser is added to the top of the resin jar, and the desired amount of imine added. The system is held at 100° C. for 60 min. with the aid of a hot silicone oil bath. The pre-treated polyester is then cooled and stored until needed for subsequent reactions.

EXAMPLE V

A 500 ml. glass resin jar is fitted with a stainless steel, air-driven, propeller type agitator, a thermometer, an inlet port, a nitrogen inlet and a nitrogen exit port. The resin jar is provided with an electrically heated silicone oil bath, held at about 170° C., and the resin jar is dried by heating to 100° C. and is purged with nitrogen for about 30 minutes. This resin jar is charged with the polyester diol and butanediol. The mixture is heated from room temperature to about 110° C. using the silicone oil bath. MDI diisocyanate is then rapidly syringed from a pre-heated syringe into the resin jar through the inlet port. The MDI must remain above 45° C. to prevent solidification within the syringe. The agitator in the resin jar is turned on sufficiently slowly to avoid splashing onto the resin jar walls. With the oil bath still in place, the reaction mixture thickens, and internal temperature rises to The above table shows that elastomers with desirably high elongations were obtained with the pre-treated polyester precursors of the instant composition. Tensile strength is also higher with the instant composition. However, when test strips were immersed in boiling water for 70 hrs., a commonly used test for screening hydrolytic stability of polyurethanes, those based on a non-pretreated polyester had lost significant amounts of break elongation when the boiled samples had been dried, conditioned and retested. Those with pre-treated polyester even gained elongation slightly, clearly demonstrating no loss in elasticity had occurred.

Since it is obvious that numerous changes and modifications can be made in the above-described details without departing from the spirit and nature of the invention, it is to be understood that all such changes and modifications are included within the scope of the invention.

Having thus described my invention, what I claim as new and novel and desire to be secured by Letters Patent, is as follows:

1. A polyurethane having improved hydrolytic stability, comprising the reaction product of a mixture of (A) a primary imine pre-treated polyhydroxy terminated polyester and (B) an aliphatic glycol reacted with (C) an aryl diisocyanate, the molar amount of (A) and (B) combined, being substantially equivalent to the molar amount of (C) said mixture of (A) and (B) having an average molecular weight of about 350 to about 850 wherein the ratio of said primary imine to said polyester is 0.001 to 0.25% by weight.

2. A polyurethane as defined in claim 1 wherein component (A) is an imine pre-treated polyester-hydroxy polyether and component (B) is a low molecular weight diol.

3. A polyurethane as defined in claim 1 wherein said polyester has a molecular weight of between about 600 and about 3500.

4. A polyurethane as defined in claim 1 containing approximately 0.7 to 2.6 moles of (B) per mole of (A).

5. A polyurethane as defined in claim 1 wherein component (B) contains 2 to 12 carbon atoms per mole of (A).

6. A polyurethane as defined in claim 1 wherein component (A) is a polyester of an aliphatic dicarboxylic acid containing 4 to 12 carbon atoms and an aliphatic glycol containing between 4 to 10 carbon atoms, and component (B) contains 2 to 10 carbon atoms.

7. A polyurethane as defined in claim 6 wherein component (A) has a molecular weight between about 800 and 2000, component (B) contains 4 to 6 carbon atoms in an amount of about 0.8 to 2 moles per mole of (A) and the average molecular weight of the mixture is about 100 to about 600.

8. A polyurethane as defined in claim 6 wherein component (A) is a poly (1,4-butanediol adipate), component (B) is 1,4-butanediol and component (C) is 4-4'-diphenyl methane-p,p-diisocyanate.

9. A process for preparing a polyurethane as defined in claim 1 comprising treating a poly hydroxy terminated polyester with 0.001 to 0.25% by weight of a primary imine and thereafter reacting same with components (B) and (C).

10. A process as defined in claim 9 wherein said primary imine has the formula

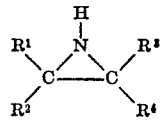

wherein $R^1$, $R^2$, $R^3$ and $R^4$ may be hydrogen, $C_{1-12}$ alkyl, aryl, alkaryl and alkyl ether.

11. A process as defined in claim 10 wherein said primary imine is ethylene or propylene imine.

12. A process as defined in claim 9 wherein heating is carried out at temperatures ranging from about 50 to about 180° C.

13. A process as defined in claim 9 wherein the ratio of said primary imine to said polyester is 0.001 to 0.25% by weight.

14. An article having improved hydrolytic stability made from the polyurethane as defined in claim 1.

References Cited
UNITED STATES PATENTS

| | | | |
|---|---|---|---|
| 3,262,991 | 7/1966 | McClendon et al. | 260—873 |
| 3,507,837 | 4/1970 | Hidinger | 260—78.4 |
| 3,637,583 | 1/1972 | Metzger | 260—45.8 A |

DONALD E. CZAJA, Primary Examiner

H. S. COCKERAM, Assistant Examiner

U.S. Cl. X.R.

260—75 N, 75 T, 77.5 SS